UNITED STATES PATENT OFFICE.

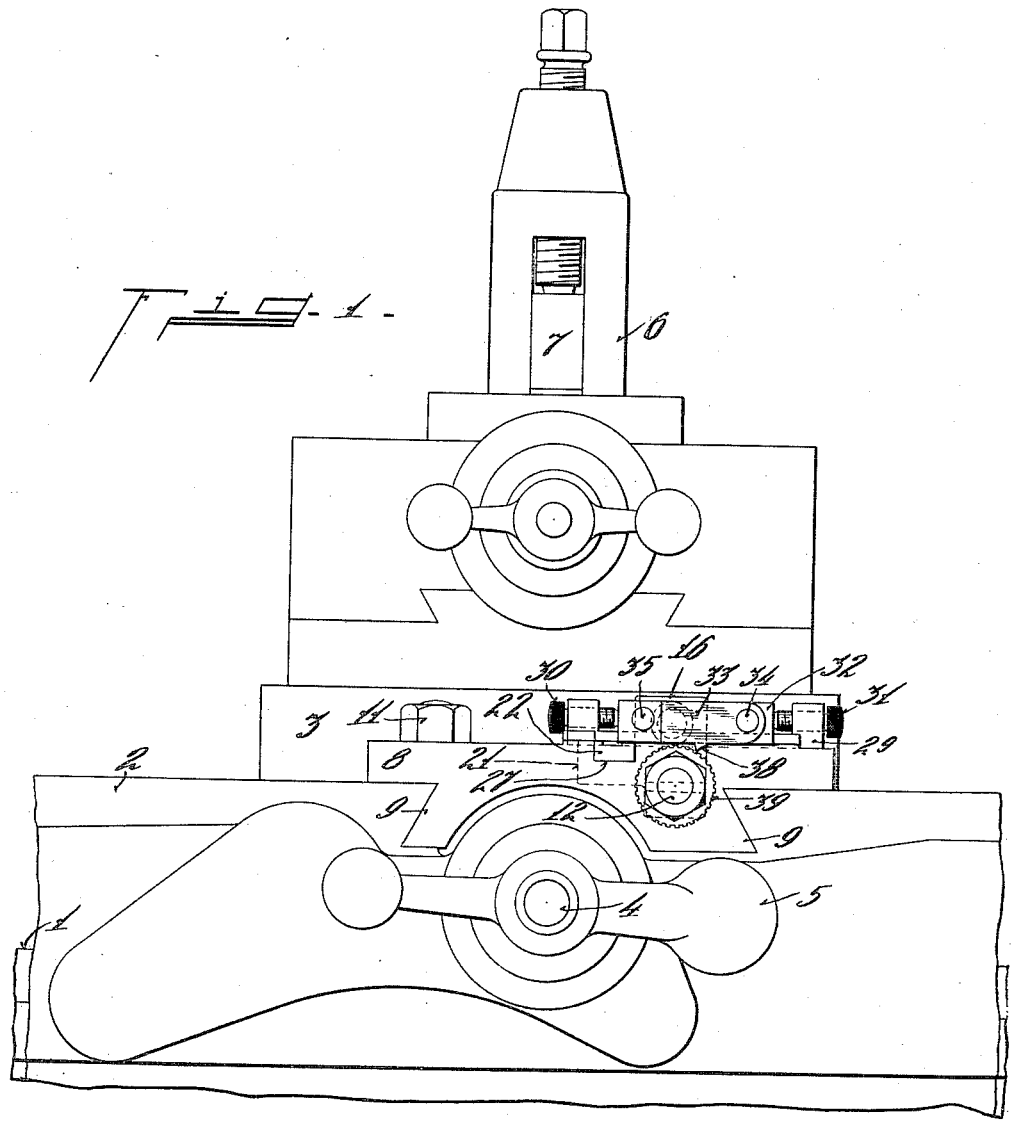

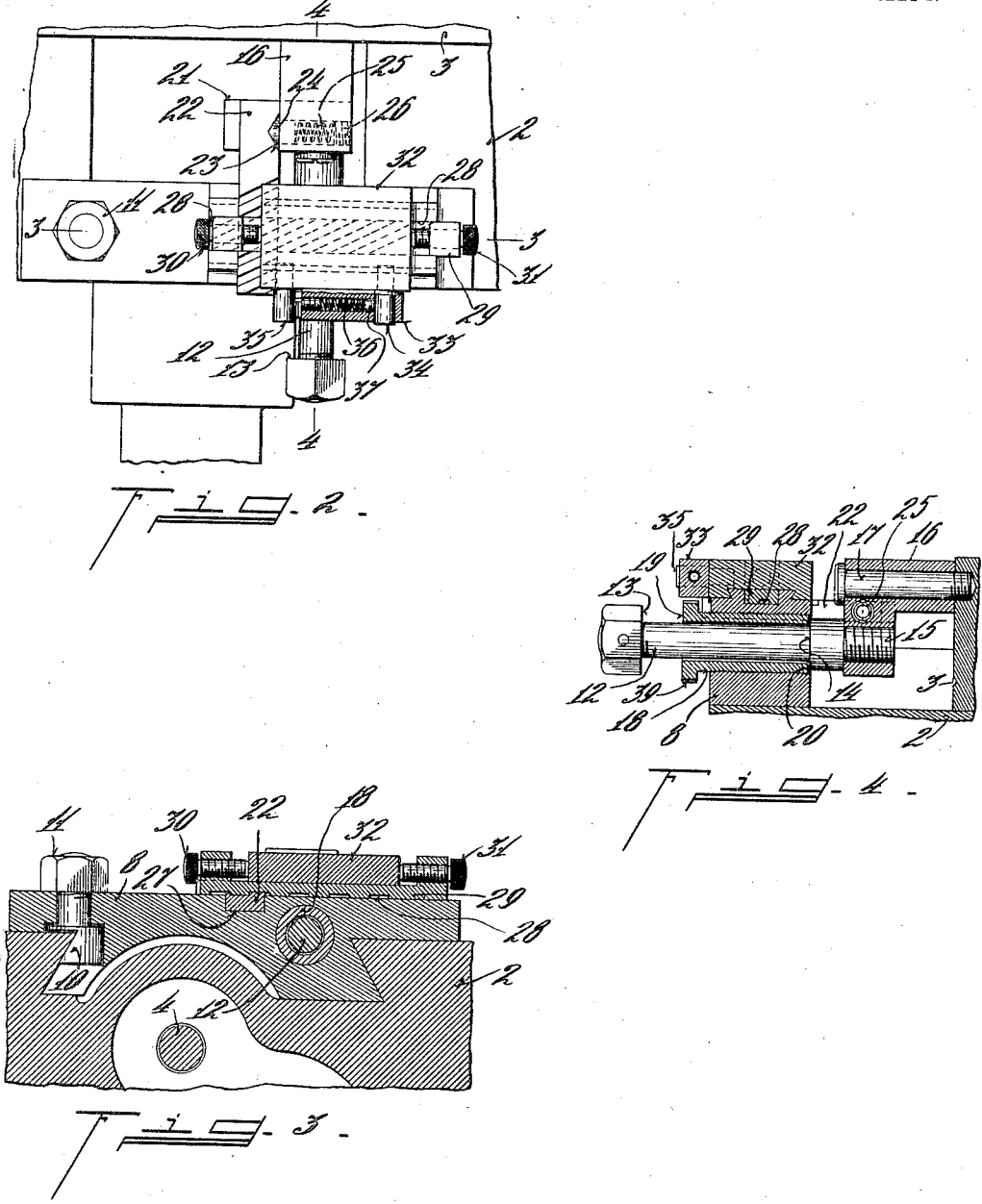

WILLIAM SCHELLENBACH, OF HARTWELL, OHIO.

CHASING-STOP.

1,067,139.

Specification of Letters Patent.

Patented July 8, 1913.

Application filed October 28, 1912. Serial No. 728,323.

*To all whom it may concern:*

Be it known that I, WILLIAM SCHELLENBACH, a citizen of the United States, residing at Hartwell, in the county of Hamilton and State of Ohio, have invented certain new and useful Improvements in Chasing-Stops, of which the following is a specification.

This invention relates to an instrumentality for progressively varying the limits of feed of a cutting tool actuated in recurring cycles, and in its preferred aspect it deals with an attachment for a lathe controlling the depth of cut of a tool as it makes its successive runs over the work in chasing a thread.

In cutting a thread it is customary in the better classes of work to do so in successive stages by first running the tool over the work to make a shallow cut, and then to repeat this operation until the cut is sufficiently deep to conform to the requirements of a perfect thread. To do this by hand without the assistance of some means for automatically controlling the depth of cut at each operation requires a very close attention by the operator and considerable skill, otherwise he is liable to take a cut too shallow to secure the best labor efficiency or too deep to secure the smoothest work in the finished product. It is also important that the final cut should not be made so deeply as to produce an undersized thread.

Now this invention contemplates an instrumentality in the nature of an attachment to the tool carriage of a lathe having the office of automatically insuring and determining a proper depth of cut for each successive run of the cutting tool over the thread, and also operative ultimately to control the depth of the last cut so that the resultant thread will conform precisely to the predetermined size.

Another object is to create an instrumentality of the above defined nature that embodies features of adjustability whereby the standard size of the final product may be adjustably predetermined and whereby the depth of cut at each successive run may also be regulated, and whereby the attachment may be operative to function in cutting external screw threads or reversely in cutting internal screw threads.

Another object is to render available a device possessing one or more of the above stated capacities that will be structurally of a compact, simple and comparatively inexpensive character and which will be convenient in use and easily understood by an ordinary machine tool operator.

Other objects will be in part apparent from the annexed drawings and in part pointed out in the following description in connection therewith.

In order that this invention may be so fully disclosed to those skilled in this art that they may be enabled to embody the same in the various forms and modifications to which it is readily subject, drawings exemplifying a preferred form have been appended as a part of this disclosure, and in such drawings, like characters of reference denote corresponding parts throughout all of the figures, of which:—

Figure 1 is a front elevation showing a compound slide rest supported on the bed of a lathe and having attached thereto a cyclic progressively varying feed limiting mechanism conforming to this invention. Fig. 2 is a plan view showing further details of the construction and arrangement of this mechanism. Fig. 3 is a section taken along line 3—3 of Fig. 2. Fig. 4 is a section taken along line 4—4 of Fig. 2.

Continuing now by way of a more detailed description of the annexed drawings, 1 indicates a lathe bed on which the base 2 is arranged longitudinally to slide. Surmounting the base 2 is a part 3 that in conventional types is adapted to slide transversely thereon and be propelled by a feed screw 4 adapted to be actuated by the hand wheel 5 so as to feed the part 3 transversely. Surmounting this part in an appropriate manner is the tool post 6 carrying the cutting tool 7. Ordinarily in cutting threads by hand the operator will cause the tool post 6 to be moved toward the work so that the tool 7 may start cutting and this may be done by turning the handle 5. Should the operator turn it too much or too little there will be a loss in labor efficiency or an impaired quality of work as the case may be. Having done this, the carriage and its superposed parts is caused automatically to travel longitudinally at the positive invariable rate required for the cutting of the thread.

Now this invention proposes a device intervening between the carriage bed 2 and the part transversely movable thereon functioning to progressively fix the limit of relative movement therebetween. In the shown embodiment of this invention a base member 8 is adapted to be fixed to the carriage base 2 and this may conveniently be done by providing the member 8 with a wedge shaped portion 9 adapted to interfit in the slide of the carriage base 2. This base member 8 is also provided with a bolt terminating in a head 10 shaped like a gib so that by turning the nut 11 the base member 8 will be clamped rigidly to the base 2 of the carriage.

Mounted on the transversely sliding tool supporting part 3 and movable therewith is a shaft 12 that carries a shoulder 13 at one end and a second shoulder 14 at its other end (see Fig. 4). The shoulder 13 constitutes an abutment limiting the depth of cut for external screw cutting and shoulder 14 constitutes an abutment for limiting depth of cut for internal screw cutting. This shaft 12 may be mounted in any suitable manner on the part 3 but as here shown it has a screw threaded end 15 that is tapped into the angle piece 16 that is in turn secured to the part 3 by the bolt 17. An elongated collar 18 telescopes the bolt 12 and is screw threaded into an aperture through the stationary base member 8 so that the end 19 of this collar serves as a stop for the abutment 13 and in like manner the other end of the collar 18 serves as a stop 20 for the abutment 14.

From the foregoing it will be readily apparent that should the operator feed the part 3 by the hand wheel 5 it may be moved inward i. e. to the right in Fig. 4 until the abutment 13 and the stop 19 contact. This will thus determine the limit of feeding in movement of the part 3 and after the thread has been cut on the first run the operator will reverse the feed to withdraw the tool and run the carriage back to the beginning of the thread. Now however to enable a second cut to be made it will be necessary first to turn the sleeve 19 in a direction such that it will move longitudinally to the right in Fig. 4 a distance equal to that of the depth of cut to be made by the cutting tool. The means for automatically performing this operation now will be described.

The angle piece 16 has a shelf-like extension 21 extending to the left therefrom as shown by Fig. 2 and this extension slidably retains a forwardly extending rack member 22 that is provided in its edge with a notch 23 adapted to receive the double beveled friction plunger or pawl 24 projecting from an aperture in the angle piece 16 and urged into place by a spring 25 retained by the screw 26. By this arrangement the rack 22 is caused to move forward and rearward with the angle piece 16 fixed to the transversely sliding tool post supporting member 3, but in case the rack 22 meets with sufficient resistance at certain points in its travel the pawl 24 enables it to give or yield relatively to the supporting angle piece 16. The forward end of this rack slides in a channel 27 (see Fig. 3) in the stationary base member 8 and is thereby restrained against side play. The stationary member 8 also provides a similar slide-way 28 (see Figs. 2 and 4) above the slide-way 27 and arranged transversely thereto, and mounted in this slide-way is a second rack 29 having upturned ends through each of which is tapped adjusting screws 30 and 31. Straddling this second rack between the ends thereof is an actuating block 32 having a tongue and groove sliding mounting on the stationary base member 8; said block being movable in the same direction as the second rack 29. The adjusting screws aforesaid serve to determine the extent of the stroke of the block 32 relatively to that of the stroke of the rack 29. For example, when the operator turns the hand wheel 5 to feed the tool supporting part 3 through a complete stroke, the rack 29 will have a corresponding positive transverse movement in a ratio with such stroke determined by the angularity of the teeth of the racks 27 and 29 which are constantly in mesh. If the feeding stroke of the part 3 remains constant in length, so also will the traverse of the rack 29 be constant, and if the screws 30 and 31 are adjusted as shown by Fig. 3 both to bear on the opposite sides of the block 32, then will the block 32 have the same stroke as the rack 29. Should however the screws 30 and 31 be further separated, then will the stroke of the piece 32 be less than that of the rack 29 by an amount proportionate to the extent of the separation. In other words, by adjusting the screws 30 and 31, the stroke of the actuating block 32 may be varied to any predetermined extent. Thus it will be seen that by utilizing the block 32 as a means instrumental in intermittently turning the collar 18, the tool post supporting member 3 may be progressively fed into the work and the increments in the depth of cut will be constant in value. This actuation is effected by a pawl 33 adapted to be pivoted either to pin 34 or to pin 35 which project from the front edge of the actuating block 32. This pawl may contain a spring 36 and a ball 37 as shown by Fig. 2 to retain it on such pin which has a counterpart peripheral groove. There projects from the underside of the pawl a suitable lip 38 that coacts with the teeth on the periphery of the notched wheel 39 on the adjustable collar 18. Thus, according to whether the pawl 33 is mounted on the pin 34 or 35 the collar 18 will be intermittently rotated clock-wise or anti-clock-wise as the case may be and in this way the feed increments will be properly secured. Such increments may by the adjustment of the device be made greater or less to any desired extent, and they may be caused to exist at the inner limits of the transverse movement of the tool supporting parts, as for cutting external threads, or they may be caused to exist at the other end of the stroke of the tool supporting parts as in cutting internal threads.

It will thus be seen that this invention is well adapted to achieve the objects aforesaid and is capable of being given tangible form in a simple, effective and durable manner. From the foregoing disclosure other forms differing more or less from that shown by way of example will become obvious to those skilled in this art while yet embodying the principles and arrangements characterizing this invention and differentiating it from the prior art.

I therefore claim as new and desire to secure by Letters Patent:—

1. An incremental feed limiting mechanism of the nature disclosed combining a tool support movable in repeating cycles, a relatively stationary base member, a feed screw therebetween, and means independent of said feed screw intervening between said support and said member adapted automatically progressively to vary the limit of the relative movement therebetween.

2. An incremental feed limiting mechanism of the nature disclosed combining a member, a tool support movable relatively thereto in repeating cycles, a feed screw therebetween, means intervening between said member and support adapted to limit the relative movement therebetween, and a part actuated by said movable support for intermittently varying the position of said means to progressively vary the limit of relative movement between said support and said member.

3. An incremental feed limiting mechanism of the nature disclosed combining a member, a tool support movable relatively thereto in repeating cycles, a stop intervening between said member and support to limit the movement therebetween, and means actuated by the relative movement between said support and member intermittently to vary the position of said stop.

4. An incremental feed limiting mechanism of the nature disclosed combining a member, a tool support movable relatively thereto in repeating cycles, a stop having an adjustable mounting on one of said parts to limit the relative movement therebetween, means mutually actuated by each of said parts for intermittently adjusting said stop incrementally to vary the limit of movement between said parts.

5. An incremental feed limiting mechanism of the nature disclosed combining a member, a tool support movable relatively thereto in repeating cycles, a stop having a screw threaded mounting in one of said parts, and means actuated by the relative movement between said parts for intermittently rotating said member incrementally to vary a limit of relative movement therebetween.

6. An incremental feed limiting mechanism of the nature disclosed combining a member, a tool support movable relatively thereto in repeating cycles, a part having a screw threaded mounting on one of said parts adapted to be adjusted thereon to limit the relative movement between said parts, said part having peripheral teeth, and a pawl actuated by the relative movement between said member and support for intermittently engaging said teeth to progressively rotate said part.

7. An incremental feed limiting mechanism of the nature disclosed combining a member, a tool support movable relatively thereto in repeating cycles, a tubular stop having a screw threaded mounting on one of said parts, a shank extending from the other part through said stop and terminating in an abutment adapted to make contact with the stop at one limit of the relative movement therebetween, a pawl intermittently adapted to engage said stop to progressively vary the position of said stop, and means adapted by the relative movement between said parts to actuate said pawl.

8. An incremental feed limiting mechanism of the nature disclosed combining a member, a tool support movable relatively thereto in repeating cycles, mechanism for so moving said support, and means intervening between said parts adapted automatically incrementally to vary one limit of the relative movement between said parts, said means being reversible similarly to vary the other limit of said relative movement.

In testimony whereof, I have hereunto set my hand.

WILLIAM SCHELLENBACH.

Witnesses:
OLIVER B. KAISER,
CLARENCE B. FOSTER.